United States Patent
Kitamura et al.

(10) Patent No.: US 7,628,415 B2
(45) Date of Patent: Dec. 8, 2009

(54) KNUCKLE BRACKET

(75) Inventors: Kenji Kitamura, Tokyo (JP); Hideki Yamada, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 343 days.

(21) Appl. No.: 11/672,619

(22) Filed: Feb. 8, 2007

(65) Prior Publication Data

US 2007/0231066 A1 Oct. 4, 2007

(30) Foreign Application Priority Data

Mar. 30, 2006 (JP) .............................. 2006-093217

(51) Int. Cl.
*B62D 7/18* (2006.01)

(52) U.S. Cl. .................. 280/124.154; 280/124.145; 280/93.512

(58) Field of Classification Search .......... 280/124.154, 280/124.155, 93.512, 86.75, 86.751–86.753; 292/295, 341.11–341.19; 70/18
See application file for complete search history.

(56) References Cited

U.S. PATENT DOCUMENTS

| | | | | |
|---|---|---|---|---|
| 4,105,235 A | * | 8/1978 | Thiel .................. | 292/341.18 |
| 4,194,760 A | * | 3/1980 | Shiomi et al. ......... | 280/86.753 |
| 4,491,339 A | * | 1/1985 | Mizumukai et al. ... | 280/124.154 |
| 4,619,465 A | * | 10/1986 | Johnson .............. | 280/86.753 |
| 4,733,884 A | * | 3/1988 | Pettibone et al. ...... | 280/86.753 |
| 4,771,996 A | * | 9/1988 | Martinez et al. ........ | 267/220 |
| 4,822,072 A | * | 4/1989 | Preslicka et al. ..... | 280/124.154 |
| 4,948,160 A | * | 8/1990 | Barry ................. | 280/86.753 |
| 4,982,977 A | * | 1/1991 | Shimada .............. | 280/86.753 |
| 5,308,032 A | * | 5/1994 | Ohta .................. | 248/230.2 |
| 5,647,606 A | * | 7/1997 | Jordan ................ | 280/86.751 |
| 5,772,168 A | * | 6/1998 | Nakazawa et al. ....... | 248/300 |
| 6,692,012 B2 | * | 2/2004 | Fullenkamp et al. ... | 280/124.154 |
| 7,163,215 B2 | * | 1/2007 | Mathis et al. ......... | 280/86.753 |

FOREIGN PATENT DOCUMENTS

| | | | |
|---|---|---|---|
| JP | 01275276 A | * | 11/1989 |
| JP | 09-052504 | | 2/1997 |

* cited by examiner

*Primary Examiner*—Paul N Dickson
*Assistant Examiner*—Nicole Verley
(74) *Attorney, Agent, or Firm*—Rabin & Berdo, PC

(57) ABSTRACT

A knuckle bracket (1) for a cylinder (20) comprises outer and inner brackets (2, 10). The outer bracket (2) comprises a pair of outer plates (4, 5) projecting in a lateral direction with respect to a cylinder axis. The inner bracket (10) comprises a pair of inner plates (12, 13) overlap the outer plates (4, 5) on the inner side thereof. A guide (17) of having outwardly curved shape is formed on a leading edge (X, Y) of each of the inner plates (12, 13) so as to facilitate introduction of a connecting part (90) of a knuckle bracket (N) into the inner bracket (10). By forming a notch (7) on a leading edge of each of the outer plates (4, 5) to accommodate the guide (17), the size of the knuckle bracket (1) can be suppressed.

7 Claims, 3 Drawing Sheets

KNUCKLE BRACKET

FIELD OF THE INVENTION

This invention relates to a structure of a knuckle bracket which connects a cylinder of a strut type shock absorber to a knuckle spindle.

BACKGROUND OF THE INVENTION

A cylinder of a strut type shock absorber is connected to a knuckle spindle using, for example, a knuckle bracket.

The knuckle bracket comprises an outer bracket and an inner bracket. The outer bracket is formed into a substantial U shape with a main part surrounding the outer circumference of the cylinder and a pair of outer plates which projects laterally from both ends of the main part. The inner bracket is disposed inside the outer bracket. The inner bracket comprises a main part in contact with the outer circumference of the cylinder and a pair of inner plates projecting laterally from both ends of the main part. The inner bracket is welded to the outer bracket such that the inner plates overlap the outer plates.

The knuckle spindle comprises a connecting part inserted between the inner plates. Nuts are secured onto bolts passed through the outer plates, inner plates and the connecting part so as to fix the knuckle spindle to the knuckle bracket.

JPH09-052504A published by the Japan Patent Office in 1997, proposes the provision of a pair of guides having an outwardly curved shape on the leading edges of the inner plates in order to assist insertion of the connecting part of the knuckle spindle into a space between the inner plates.

SUMMARY OF THE INVENTION

According to the prior art, each of the guides wraps around the leading edge of the outer plate and reaches outside of the outer plate. Due to this arrangement, the guides project horizontally in a direction leading away from the cylinder when viewed from the side or along a direction perpendicular to the outer plate.

The guides projecting horizontally in this way result in an increase in the size of the knuckle bracket. In a shock absorber for a motor cycle, the above projection direction of the guides corresponds to the lateral direction of a motor cycle frame, and hence the guides may be an obstacle when fitting the shock absorber onto the motor cycle frame.

It is therefore an object of this invention to decrease the size of a knuckle bracket without spoiling the guiding performance of the guides.

In order to achieve the above object, this invention provides a knuckle bracket adapted to be fixed to a cylinder for connecting a knuckle spindle to the cylinder, wherein the knuckle spindle has a connecting part fixed to the knuckle bracket.

The knuckle bracket comprises a pair of outer plates disposed in parallel with each other and projecting in a lateral direction with respect to an axis of the cylinder, and a pair of inner plates overlap the outer plates on the inner side thereof.

A space between the pair of inner plates is used for accommodating the connecting part, and a guide is formed on a leading edge of each of the inner plates in an outwardly curved shape for introducing the connecting part into the space between the pair of inner plates. Each of the pair of outer plates comprises a notch in a position corresponding to the guide to accommodate the guide, thereby preventing interference between the guide and the outer plate.

The details as well as other features and advantages of this invention are set forth in the remainder of the specification and are shown in the accompanying drawings.

DESCRIPTION OF THE PREFERRED EMBODIMENTS

Figure 1:
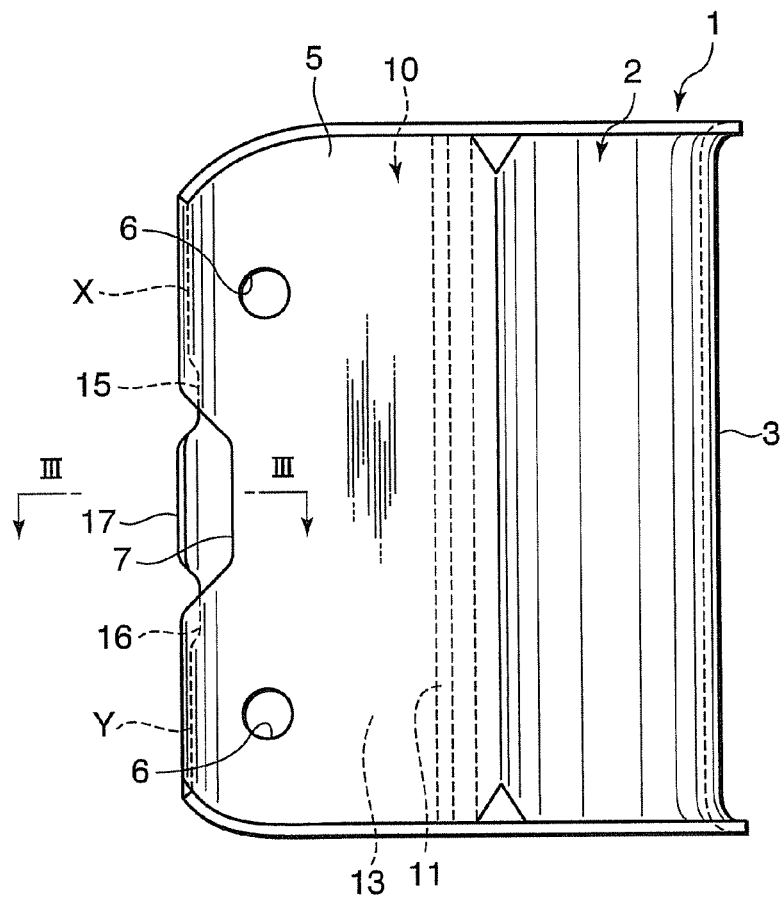
FIG. 1 is a side elevation of a knuckle bracket according to this invention.

Referring to FIG. 1 of the drawings, a knuckle bracket 1 comprises an outer bracket 2 and an inner bracket 10.

Figure 2:
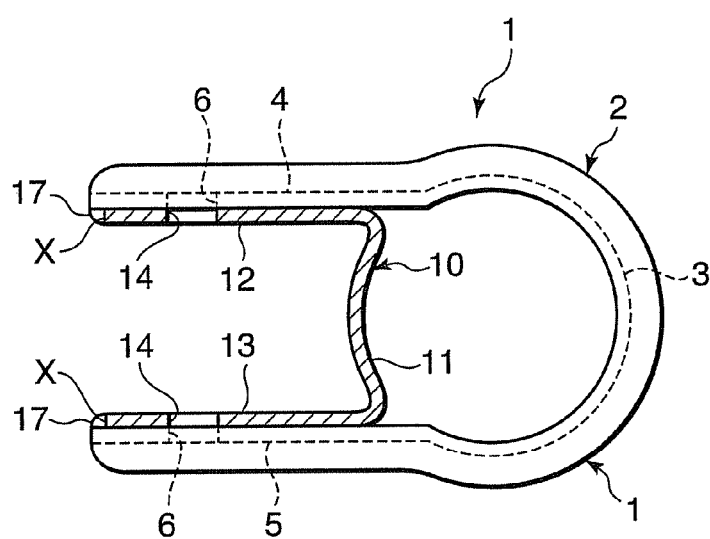
FIG. 2 is a plan view of the knuckle bracket.

Referring to FIG. 2, the outer bracket 2 comprises a main part 3 having an arc-shaped horizontal section, and a pair of outer plates 4, 5 extending from both ends of the main part 3 in parallel with each other.

The inner bracket 10 comprises a main part 11 having an arc-shaped horizontal section, which forms a substantial circle in combination with the main part 3 of the outer bracket 2, and a pair of inner plates 12, 13 extending from both ends of the main part 11.

The inner bracket 10 is welded by means of projection welding to the outer bracket 2 in a state where the inner plates 12, 13 overlap the outer plates 4, 5 on the inner side thereof.

Figure 4:
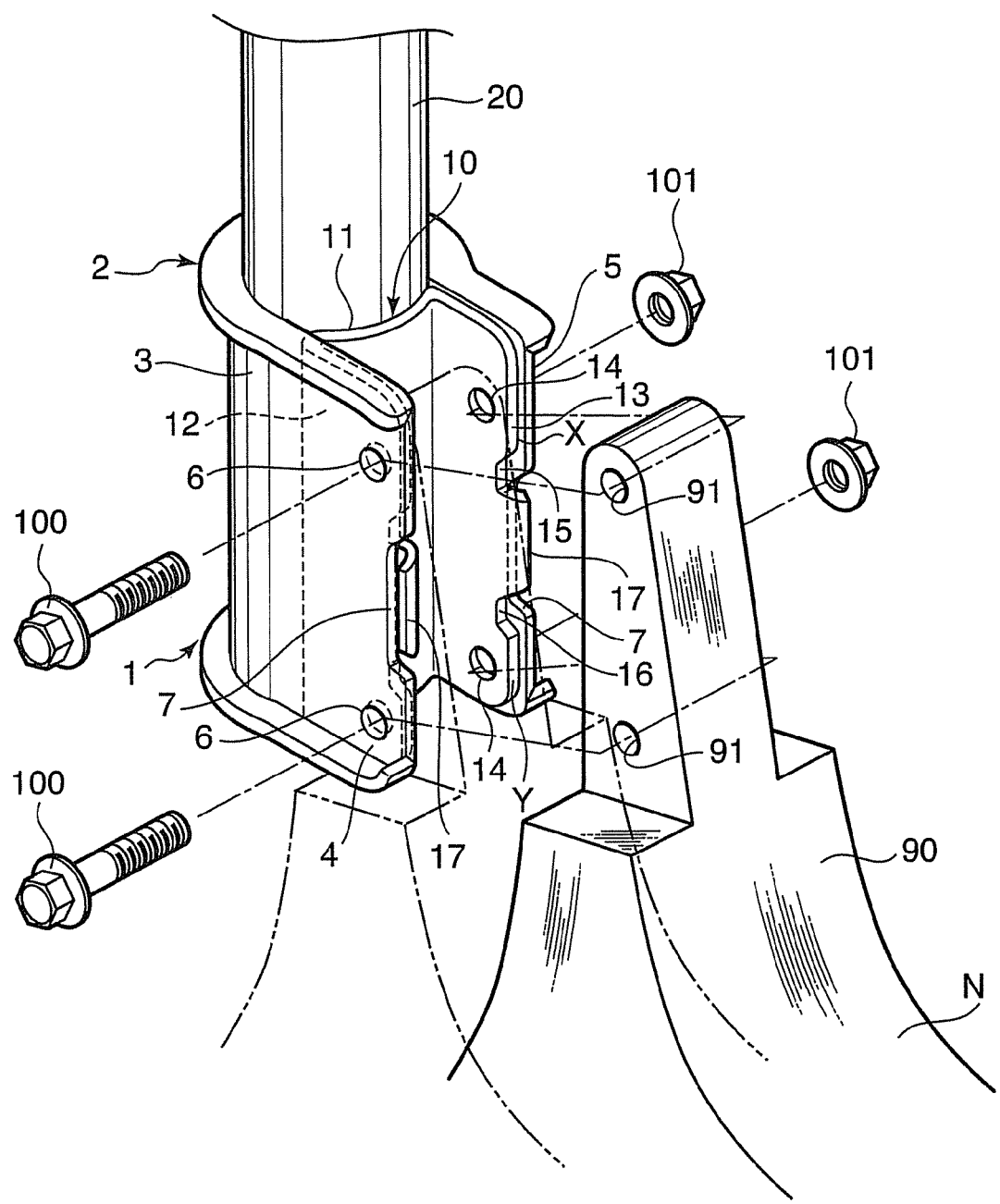
FIG. 4 is a perspective view of the knuckle bracket and a knuckle spindle.

Referring to FIG. 4, the knuckle bracket 1 is fixed to the cylinder 20 by welding, for example, in a state where the cylinder 20 is inserted into the circle formed by the main parts 3 and 11. In a state where the knuckle bracket 1 is fixed to the cylinder 20, the outer plates 4, 5 and the inner plates 12, 13 project laterally with respect to a cylinder axis of the cylinder 20.

A knuckle spindle N comprises a connecting part 90. The knuckle spindle N is fixed to the knuckle bracket 1 by inserting the connecting part 90 into a space between the inner plates 12, 13, thereby causing a pair of bolts 100 to penetrate the outer plates 4, 5, inner plates 12, 13, and the connecting part 90, and securing nuts 101 onto the tip of the bolts 100.

For this operation, a pair of bolt holes 6 are formed in each of the outer plates 4, 5, a pair of bolt holes 14 are formed in each of the inner plates 12, 13, and a pair of through-holes 91 are formed through the connecting part 90 of the knuckle spindle N.

Referring again to FIG. 1, an upper end and a lower end of the outer bracket 2 are bent outward to respectively form a band-shaped reinforcing portion which increases the rigidity of the knuckle bracket 1. In order to facilitate vertical positioning of the connecting part 90 in the space between the inner plates 12, 13, the front end of the band-shaped reinforcing portion at the lower end of the outer bracket 2 is curved upward. Similarly, the front end of the band-shaped reinforcing portion at the upper end of the outer bracket 2 is curved downward.

Notches 15 and 16 are formed on a leading edge X, Y of each of the inner plates 12, 13, and a guide 17 is formed between the notches 15 and 16. The guide 17 is a trapezoidal tab-like member which is curved horizontally outward;

A notch 7 is formed on a leading edge of each of the outer plates 4, 5 in a position corresponding to the guide 17 so as to accommodate the outwardly curved guide 17.

Figure 3:
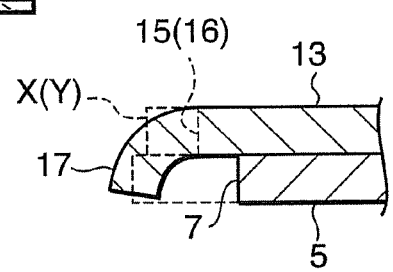
FIG. 3 is a horizontal sectional view of a guide taken along the line III-III in FIG. 1.

Referring to FIG. 3, as the tip of the guide 17 is accommodated in the notch 7, the guide 17 can be curved horizontally outward without notably projecting outside the outer plates 4 and 5. Since the notch 7 is formed only for the purpose of accommodating the tip of the guide 17, the shape of the notch 7 can be chosen freely as long as it can accomplish its purpose.

Relative locations between the guide 17 and the related parts of the outer plates 4, 5 and inner plates 12, 13 are preferably set as follows.

The guide 17 is formed such that the tip thereof slightly projects from the leading edge of the outer plate 4(5) in a direction leading away from the cylinder 20. Even if the tip of the guide 17 is in a position retreated from the leading edge of the outer plate 4(5), the outwardly curved guide 17 can still guide the connecting part 90, but in order to ensure a better performance in view of guiding the connecting part 90, it is preferable that the tip of the guide 17 slightly projects from the leading edge of the outer plate 4(5). However, if the tip of the guide 17 notably projects from the leading edge of the outer plate 4(5), the size of the knuckle bracket 1 increases. The best compromise is to suppress the projection distance within one millimeter.

With respect to the inner plate 12(13), it is preferable that the leading edge X, Y be slightly retreated from the tip of the guide 17. According to this setting, when the connecting part 90 is inserted into the space between the inner plates 12, 13, the connecting part 90 comes into contact with one of the inner plates 12, 13 before coming into contact with the leading edge X, Y, and hence the connecting part 90 is inserted between the inner plates 12, 13 while taking full advantage of the guiding performance of the guides 17.

As can be seen in FIG. 3, in this knuckle bracket 1, the tip of the outwardly curved guide 17 does not project from the notch 7 in a direction perpendicular to the outer plates 4, 5. However, it is still possible to design the guide 17 such that the tip of the guide 17 slightly projects from the notch 7 in the direction perpendicular to the outer plates 4, 5 within a range that does not increase the size of the knuckle bracket 1.

When the knuckle spindle N is fixed to the knuckle bracket 1, the connecting part 90 of the knuckle spindle N is first inserted into a space between the inner plates 12, 13 as shown in the figure. In this operation, the pair of outwardly curved guides 17 guide the connecting part 90 into the space between the inner plates 12, 13. After the connecting part 90 is positioned in the inner bracket 10, the bolts 100 are inserted into the bolt holes 6, 14 of the knuckle bracket 1 and the through-holes 91 of the connecting part 90. The nuts 101 are then secured onto the tips of the bolts 90 passed through the knuckle bracket 1 and the connecting part 90.

Since the pair of guides 17 are outwardly curved respectively such that the tips thereof invade the notches 7 of the outer plates 4, 5, the connecting part 90 is guided smoothly into the space between the inner plates 12, 13 and easily positioned inside the inner bracket 10. The tip of the guide 17 accommodated in the notch 7 does not project notably outside the outer bracket 2 in the direction leading away from the cylinder 20, and hence the knuckle bracket 1 can be made compact while maintaining the guiding performance of the guide 17.

Figure 5:
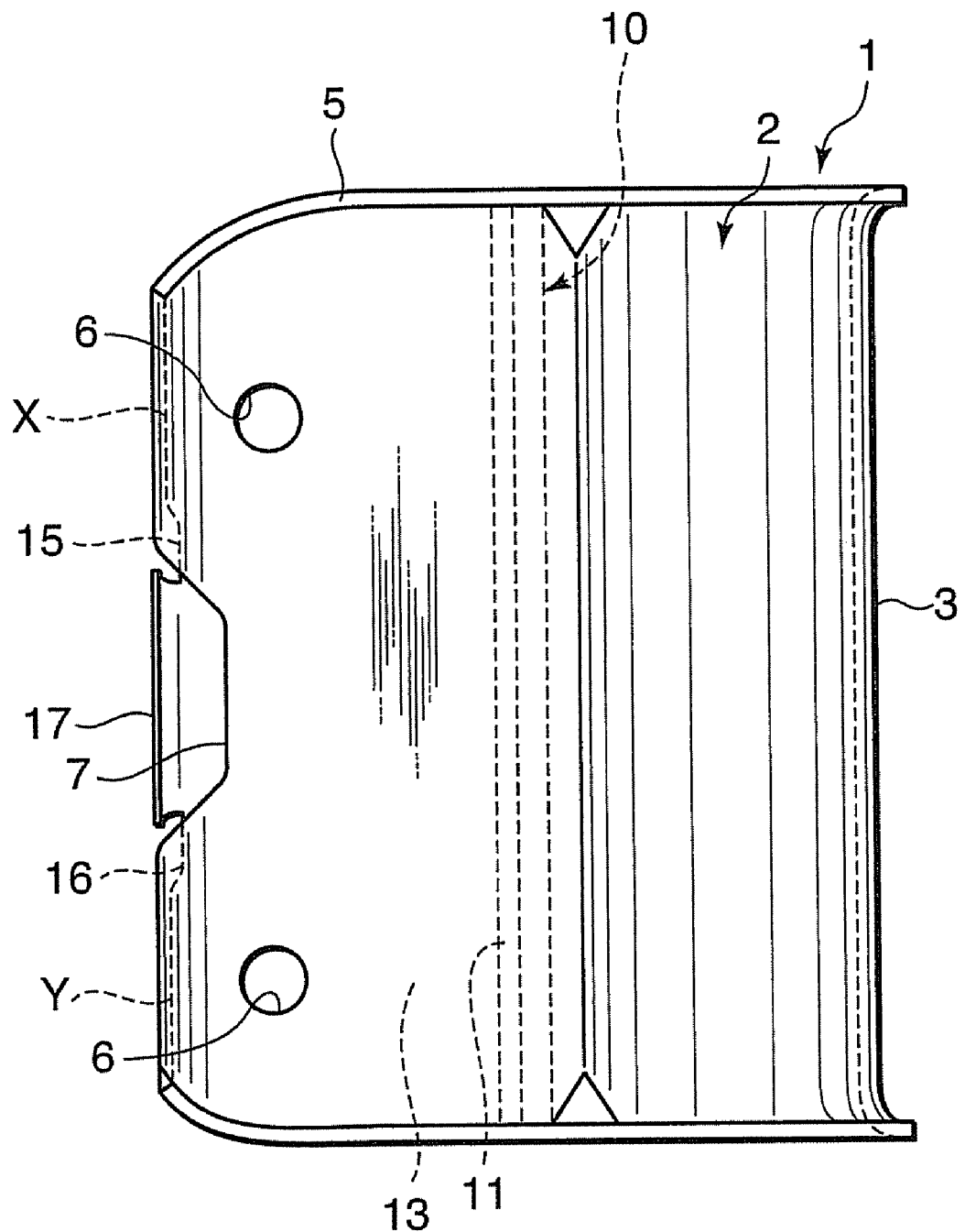
FIG. 5 is similar to FIG. 1 but shows a further embodiment of this invention.

Referring to FIG. 5, a further embodiment of this invention will be described.

Herein, the guide 17 is formed in an inverted trapezoidal shape such that the tip of the guide 17 is constituted by the bottom of the trapezoid. This configuration of the guide 17 is realized by altering the shape of the notches 15 and 16. According to this embodiment, the vertical length of the tip of the guide 17 can be set longer than that of the first embodiment, and the function of the guide 17 guiding the connecting part 90 is enhanced. Also according to this embodiment, the tip of the guide 17 is accommodated in the notch 7 of the outer plates 4(5) so as to avoid interference with the outer plate 4(5). Also according to this embodiment, the size of the knuckle bracket 1 can be suppressed.

The contents of Tokugan 2006-093217, with a filing date of Mar. 30, 2006 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, in the embodiments described above, the notches 15, 16 are formed on both sides of the guide 17. However, the notches 15, 16 are not essential features of this invention. It is also possible to configure the inner plate 10 such that the notches 15, 16 are omitted and the guide 17 projects directly from the leading edge X, Y of the inner plates 12, 13. This configuration corresponds to a case in which the leading edge X, Y is retreated to the bottom of the notches 15, 16 in FIG. 1.

It is also possible to arbitrarily alter the design of the main part 3 of the outer bracket 2 and the main part 11 of the inner bracket 10.

What is claimed is:

1. A knuckle bracket adapted to be fixed to a cylinder for connecting a knuckle spindle to the cylinder, the knuckle spindle having a connecting part for connecting to the knuckle bracket, comprising:
    a pair of outer plates disposed in parallel with each other and projecting in a lateral direction with respect to an axis of a portion of the knuckle bracket that accommodates the cylinder;
    a pair of inner plates overlapping the outer plates on an inner side thereof, a space between the pair of inner plates being formed for accommodating the connecting part; and
    a guide formed on a leading edge of each of the inner plates, the guide having an outwardly curved shape for introducing the connecting part of the knuckle spindle into the space between the pair of inner plates;
    wherein, each of the outer plates includes a notch in a position corresponding to the guide to accommodate the guide.

2. The knuckle bracket as defined in claim 1, wherein each of the inner plates includes a pair of notches formed on both sides of the guide thereof.

3. The knuckle bracket as defined in claim 1, wherein the guide has a tip projecting beyond the leading edge of each of the inner plates in a direction leading away from the portion of the knuckle bracket that accommodates the cylinder.

4. The knuckle bracket as defined in claim 3, wherein the tip of the guide projects beyond the leading edge of each of the outer plates in the direction leading away from the portion of the knuckle bracket that accommodates the cylinder, and a distance from the leading edge of each of the outer plates to the tip of the guide is set within one millimeter.

5. The knuckle bracket as defined in claim 1, wherein the guide is formed in an inverted trapezoidal shape.

6. The knuckle bracket as defined in claim 1, wherein the pair of outer plates and the pair of inner plates respectively have bolt holes, such that a bolt can pass through the bolt holes and a corresponding through-holes of the connecting part of the knuckle spindle to fix the connecting part of the knuckle spindle to the knuckle bracket.

7. The knuckle bracket as defined in claim 1, wherein the pair of outer plates are formed as a part of an outer bracket which includes a first main part having an arc shape so as to be contactable with the cylinder, the pair of outer plates projecting from both ends of the first main part, and the pair of inner plates are formed as a part of an inner bracket which comprises a second main part having the arc shape so as to be contactable with the cylinder, the pair of inner plates projecting from both ends of the second main part of the inner bracket.

\* \* \* \* \*